United States Patent [19]
O'Dougherty et al.

[11] Patent Number: 5,924,794
[45] Date of Patent: *Jul. 20, 1999

[54] CHEMICAL BLENDING SYSTEM WITH TITRATOR CONTROL

[75] Inventors: Kevin T. O'Dougherty, Minneapolis; Travis A. Lemke, St. Paul; Donald C. Grant, Exelsior, all of Minn.

[73] Assignee: FSI International, Inc., Chaska, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/395,374

[22] Filed: Feb. 21, 1995

[51] Int. Cl.⁶ .............................. B01F 15/02; G05D 11/08
[52] U.S. Cl. ...................... 366/136; 366/140; 366/152.1; 366/160.2; 137/93
[58] Field of Search ................................. 366/136, 137, 366/140, 151.1, 152.1, 159.1, 160.1, 160.2, 162.1; 137/3, 93, 563

[56] References Cited

U.S. PATENT DOCUMENTS

| | | | |
|---|---|---|---|
| 4,403,866 | 9/1983 | Falcoff et al. | 366/132 |
| 4,571,088 | 2/1986 | Frensch et al. | 366/136 |
| 4,584,002 | 4/1986 | Cox et al. | 55/257 |
| 4,844,620 | 7/1989 | Lissant et al. | 366/136 |
| 4,857,355 | 8/1989 | Gregg | 426/590 |
| 4,863,277 | 9/1989 | Neal et al. | 366/137 |
| 4,977,929 | 12/1990 | Chinnock et al. | 137/863 |
| 5,002,086 | 3/1991 | Linder et al. | 137/312 |
| 5,334,496 | 8/1994 | Pond et al. | 430/569 |
| 5,348,389 | 9/1994 | Jonsson et al. | 366/136 |
| 5,522,660 | 6/1996 | O'dougherty et al. | 366/136 |

OTHER PUBLICATIONS

Declaration of Kevin T. O'Dougherty, dated Aug. 11, 1995 (5 pages).
Applikon Analyzers, Inc. brochure, "On–line Analysis, the Applikon way to obtain laboratory accuracy and long term reliability in process analysis", 8 pages, Mar. 1991.
"ChemFill Chemical Collection Systems," SP Application Note 113, FSI International, May 1995, 2 pages.
"ChemFill Model 1000 Chemical Delivery Module," Data Sheet, FSI International, May 1995, 2 pages.
"ChemFill ChemBlend 100 Chemical Blending System," Data Sheet, FSI International, May 1995, 2 pages.
"ChemFill Model 5000 Chemical Delivery Module," Data Sheet, FSI International, May 1995, 2 pages.
"ChemFill Control Systems," Data Sheet, FSI International, Jun. 1995, 4 pages.
"Pure Genius" FSI ChemFill Ultra–Pure Bulk Chemical Delivery Systems . . . For Those of You Who Can See the Future, FSI International, undated, 6 pages.

*Primary Examiner*—Tony G. Soohoo
*Attorney, Agent, or Firm*—Faegre & Benson LLP

[57] ABSTRACT

A chemical blending system for blending two or more constituent chemicals to a desired concentration. One embodiment of the system includes a mix tank, a recirculation line having an inlet and an outlet in the tank, and a pump in the recirculation line for recirculating and mixing the blended chemical. A source of diluent is fluidly coupled to the mix tank through a diluent inlet and supply line. A source of concentrated chemical is fluidly coupled to the recirculation line through a concentrated chemical inlet, supply line, and an adding valve located in the recirculation line between the inlet and pump. A conductivity-type sensor in the recirculation line provides continuous measurements of the blended chemical concentration. A titration analyzer is coupled to the recirculation line to provide periodic blended chemical concentration measurements. A programmable logic control system including a processor and associated memory is coupled to the adding valve, conductivity-type sensor and titration analyzer. A blending control program and process control values are stored in the memory. The processor executes the blending control program and controls the concentrate adding valve as a function of the concentration measurements provided by the conductivity-type sensor and titration analyzer to blend the chemical to the desired concentration.

40 Claims, 6 Drawing Sheets

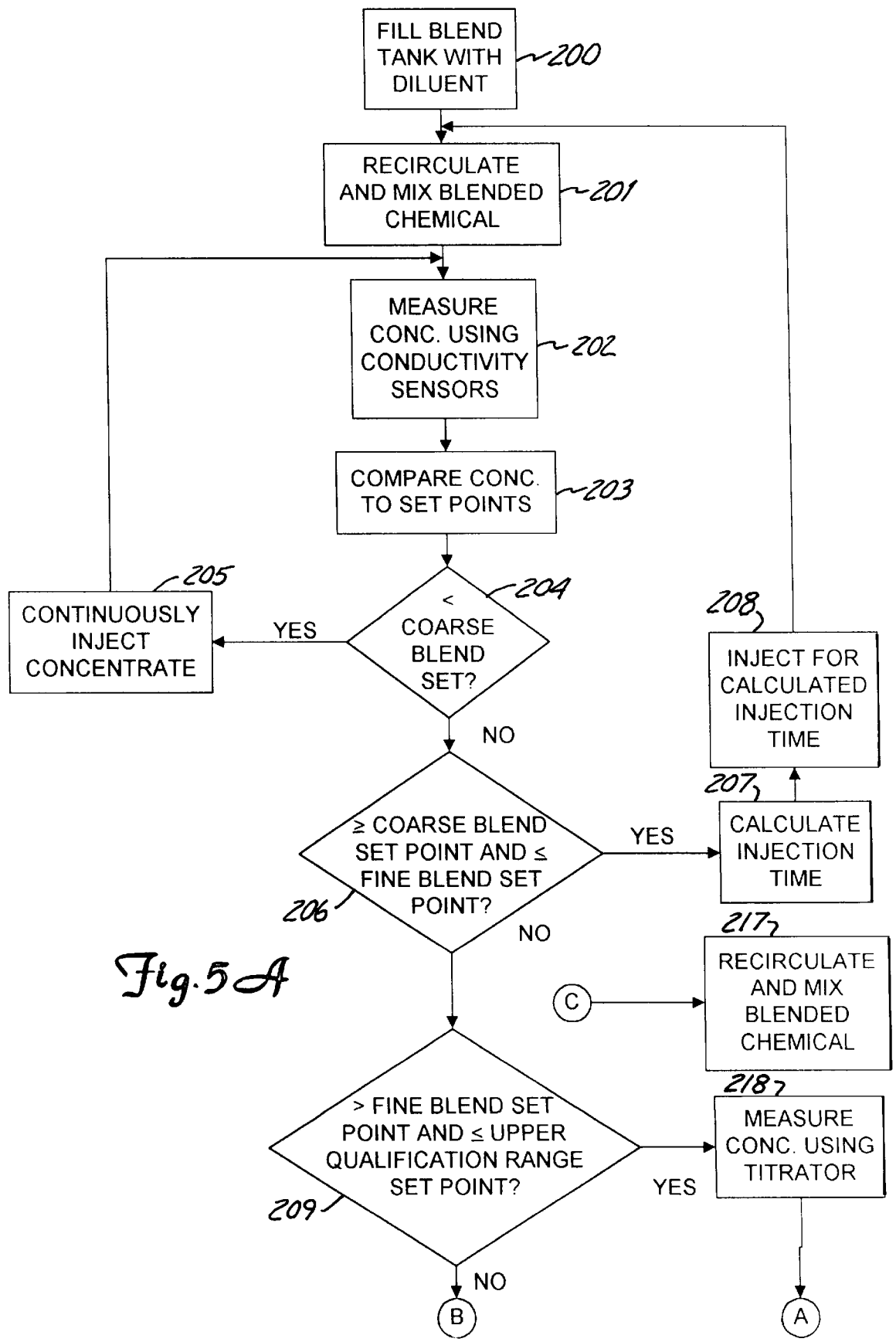

CHEMICAL BLENDING SYSTEM WITH TITRATOR CONTROL

BACKGROUND OF THE INVENTION

1. Field of the Invention

The present invention is a chemical blending system. In particular, the present invention is a computer-controlled system for blending batches of concentrated chemicals from two or more chemical components for subsequent use in semiconductor fabrication facilities.

2. Description of the Related Art

Chemical generation or blending systems are used in a variety of industrial applications to blend two or more components or constituents to a desired concentration. In semiconductor fabrication facilities, for example, concentrated chemicals (which are usually provided by commercial chemical suppliers in solution with water) are mixed or diluted with DI (deionized) water before being sprayed on or otherwise applied to semiconductor wafers. Table 1 below lists a number of chemicals used in semiconductor fabrication facilities, and the concentration (in weight %) in which these chemicals are typically provided by suppliers.

TABLE 1

| Chemical | Symbol | Percentage Concentrate in Water |
|---|---|---|
| Hydrofluoric Acid | HF | 49% |
| Acetic Acid | HAC | 99.7% |
| Nitric Acid | $HNO_3$ | 71% |
| Phosphoric Acid | $H_3PO_4$ | 80% |
| Potassium Hydroxide | KOH | 30% |
| Tetramethyl Ammonium Hydroxide | TMAH | 25% |
| Hydrochloric Acid | HCl | 37% |
| HF and Ammonium Fluoride Mixtures | BOEs | — |
| Ammonium Hydroxide | $NH_4OH$ | 28–30% |
| Sulfuric Acid | $H_2SO_4$ | 93–98% |

When used in semiconductor fabrication facilities, the concentrated chemicals described above are commonly diluted with DI water (i.e., a diluent) to desired concentrations or assays. Concentrations in these applications are typically described in terms of weight % (weight percent) of concentrated or pure chemical in water. Hydrofluoric Acid (HF), for example, is often diluted with high purity water to concentrations ranging from about 0.5%–5% HF by weight when used for etching and cleaning processes. Tetramethyl Ammonium Hydroxide (TMAH) is often diluted to about 2.38 weight % for use as a positive photoresist developer. Non-aqueous blended chemicals, and blended chemicals with three or more components, can also be generated.

Chemical blending systems blend the chemicals to a desired concentration which is sometimes known as the nominal or qualification concentration. A high degree of accuracy is also required. The range or window of acceptable concentrations surrounding the qualification concentration is known as the qualification range, and can be defined as a weight % error with respect to the qualification concentration, or by upper and lower qualification range concentrations.

A known chemical blending system which is commercially available from FSI International of Chaska, Minn., the assignee of the present invention, is disclosed generally in commonly assigned application Ser. No. 08/355,671, filed Dec. 14, 1994 and entitled "Apparatus For Blending Chemical And Diluent Liquids". This chemical blending system includes a mix tank for the blended chemical, a recirculation line having an inlet and outlet in the mix tank, and a pump in the recirculation line. A source of a first constituent of the blended chemical, such as DI water which is used as a diluent, is coupled to the mix tank through an inlet and supply line. A source of a second constituent of the blended chemical, such as the concentrated chemical to be diluted, is coupled to the recirculation line through an inlet, source line and adding valve. The adding valve is located in the recirculation line on the suction side of the pump (i.e., between the pump and the inlet of the recirculation line), and is controlled by a microprocessor-based control system. When the pump is operating and the adding valve is open, concentrated chemical is drawn into the recirculation line. Recirculation of the blended chemical through the recirculation line causes the blended chemical and added concentrate to be thoroughly mixed.

Concentration of the blended chemical is monitored by conductivity-type sensors in the recirculation line between the pump and inlet. The sensors are coupled to the control system through analyzers that convert the conductivity readings provided by the sensors to concentration values used by the control system.

The control system initiates a chemical blending cycle by filling the mix tank with a desired quantity of DI water and activating the pump to recirculate the blended chemical within the tank and recirculation line. The concentrate adding valve is then opened to provide a continuous flow of concentrated chemical into the recirculation line. During this continuous injection phase of the blending cycle the concentration of the blended chemical is monitored continuously and compared to a coarse blend setpoint. The coarse blend setpoint can be empirically determined, and represents a concentration which is sufficiently less than the qualification concentration that the continuous addition of concentrated chemical will approach, but not exceed or overshoot, the qualification concentration if the addition of concentrated chemical is stopped when the measured concentration has increased to the coarse blend setpoint. Once the control system determines that the measured blended chemical concentration has reached the coarse blend setpoint, it closes the concentrate adding valve.

The control system then periodically opens and closes the concentrate adding valve during a periodic injection phase. Relatively small quantities of the concentrated chemical are added during the time periods that the valve is open, and the added concentrated chemical is mixed with the blended chemical while the valve is closed. The concentration of the blended chemical is continuously measured and compared to the qualification concentration during this periodic injection phase. To ensure that the concentration measurements are made in homogeneous and thoroughly blended chemical, the duty cycle of the period during which the concentrate adding valve is open is relatively short compared to the duty cycle of the time period during which the valve is closed. Furthermore, to minimize the chances that the concentration will exceed the qualification range, the duty cycle of the time period during which the valve is open is relatively short so as to increase the concentration in relatively small increments. In one embodiment, for example, the open valve duty cycle is about six seconds while the closed valve duty cycle is about twenty-four seconds. When the measured concentration reaches the qualification concentration, the control system qualifies the blended chemical batch and ceases further concentrated chemical addition. The blended chemical can then be pumped to its point of use.

The conductivity-type sensors used in the chemical blending system described above are capable of providing continuous and almost instantaneous measurements of the blended chemical concentration. The accuracy of the measurements provided by the conductivity-type sensors is also good. Nonetheless, blended chemical concentration variations within the range of accuracy that can be provided through the use of conductivity-type sensors can result in semiconductor fabrication process variations. These process variations can detrimentally affect the physical and electrical characteristics of the semiconductor wafers being processed. The problems associated with these process variations will become even more critical as the circuit geometries on the wafers become smaller and the circuit patterns more complex. Chemical blending systems capable of blending chemicals to higher concentration accuracy levels or tolerances are therefore needed to keep pace with other advances in semiconductor fabrication processes.

The use of titration analyzers to measure the concentration of blended chemicals produced by chemical blending systems is also known. Titration analyzers are commercially available from a number of suppliers including Applikon Dependable Instruments of the Netherlands, through its North American distributer Applikon Analyzers, Inc. of Kingwood Tex. When actuated, analyzers of this type draw a sample of the blended chemical. The sample is then titrated with reagents and its pH or pH inflection point measured to determine the concentration of the blended chemical. Titration analyzers are capable of providing concentration measurements to a higher degree of accuracy than conductivity-type sensors (e.g., to less than about 0.10% relative error (i.e., error/setpoint) at three standard deviations or three sigma ($3\sigma$)).

For a number of reasons including the minimization of storage container space, the propensity of containers to contaminate chemicals during prolonged storage and the tendency of concentration values to change with time, chemicals are typically blended relatively frequently and in relatively small batches. The batches of blended chemical are then used relatively soon after they are produced. Chemical blending systems must therefore be capable of quickly blending the batches of chemical to the desired concentration. Unfortunately, titration analyzers have a relatively slow measurement response time (about 3–5 minutes per measurement) compared to the nearly instantaneous response of conductivity-type sensors. Since a number of concentration measurements are typically required before a batch of blended chemical can be qualified, the use of titration analyzers can increase the length of time required to blend a batch of chemical.

It is evident that there is a need for improved chemical blending systems. In particular, there is a need for chemical blending systems capable of quickly blending batches of chemical to a very high degree of accuracy. To be commercially viable, the chemical blending system must also be highly reliable.

SUMMARY OF THE INVENTION

The present invention is a chemical blending system capable of quickly and accurately blending chemicals to a desired concentration. One embodiment of the chemical blending system includes a concentrated chemical inlet for receiving concentrated chemical, a diluent inlet for receiving diluent, and a blending tank coupled to the concentrated chemical inlet and the diluent inlet for receiving and blending the concentrated chemical. A flow control mechanism responsive to concentration control signals controls the flow of diluent from the diluent inlet into the blending tank. The system also includes first and second concentration measuring instruments. The first concentration measuring instrument has first operating characteristics and provides first instrument readings as a function of the measurements. The second concentration measuring instrument has second operating characteristics different than the first operating characteristics, and provides second instrument readings as a function of the measurements. A programmable logic controller including a processor and memory are coupled to the first and second concentration measuring instruments and to the flow control mechanism. Information stored in the memory includes concentration data, fine setpoint data and qualification setpoint data. The concentration data is representative of the relationship between the concentration control signals and blended chemical concentration changes induced by actuation of the flow control mechanism. The fine setpoint data is representative of a first chemical concentration which is less than the desired chemical concentration. The qualification setpoint data is representative of a chemical concentration within a qualification range of the desired concentration. The blending control program executed by the processor includes:

(a) monitoring first instrument readings of blended chemical concentration measurements provided by the first concentration measuring instrument;

(b) generating concentration control signals as a function of the concentration data and the first instrument readings, to actuate the flow control mechanism and attempt to increase the blended chemical concentration to the desired concentration if the first monitored instrument reading is less than or equal to the fine concentration setpoint;

(c) monitoring second instrument readings of blended chemical concentration measurements provided by the second concentration measuring instrument if the first monitored instrument reading is greater than the fine concentration setpoint;

(d) generating concentration control signals as a function of the concentration data and the second instrument readings, to actuate the flow control mechanism and attempt to increase the blended chemical concentration to the desired concentration if the second monitored instrument reading is greater than the fine concentration set point and less than the qualification setpoint; and (e) repeating functions (c)–(d) until the second instrument reading is within the qualification range.

BRIEF DESCRIPTION OF THE DRAWINGS

FIGS. 5A and 5B are flow diagrams of a chemical blending program executed by the control subsystem shown in FIG. 2.

DETAILED DESCRIPTION OF THE PREFERRED EMBODIMENTS

Figure 1:
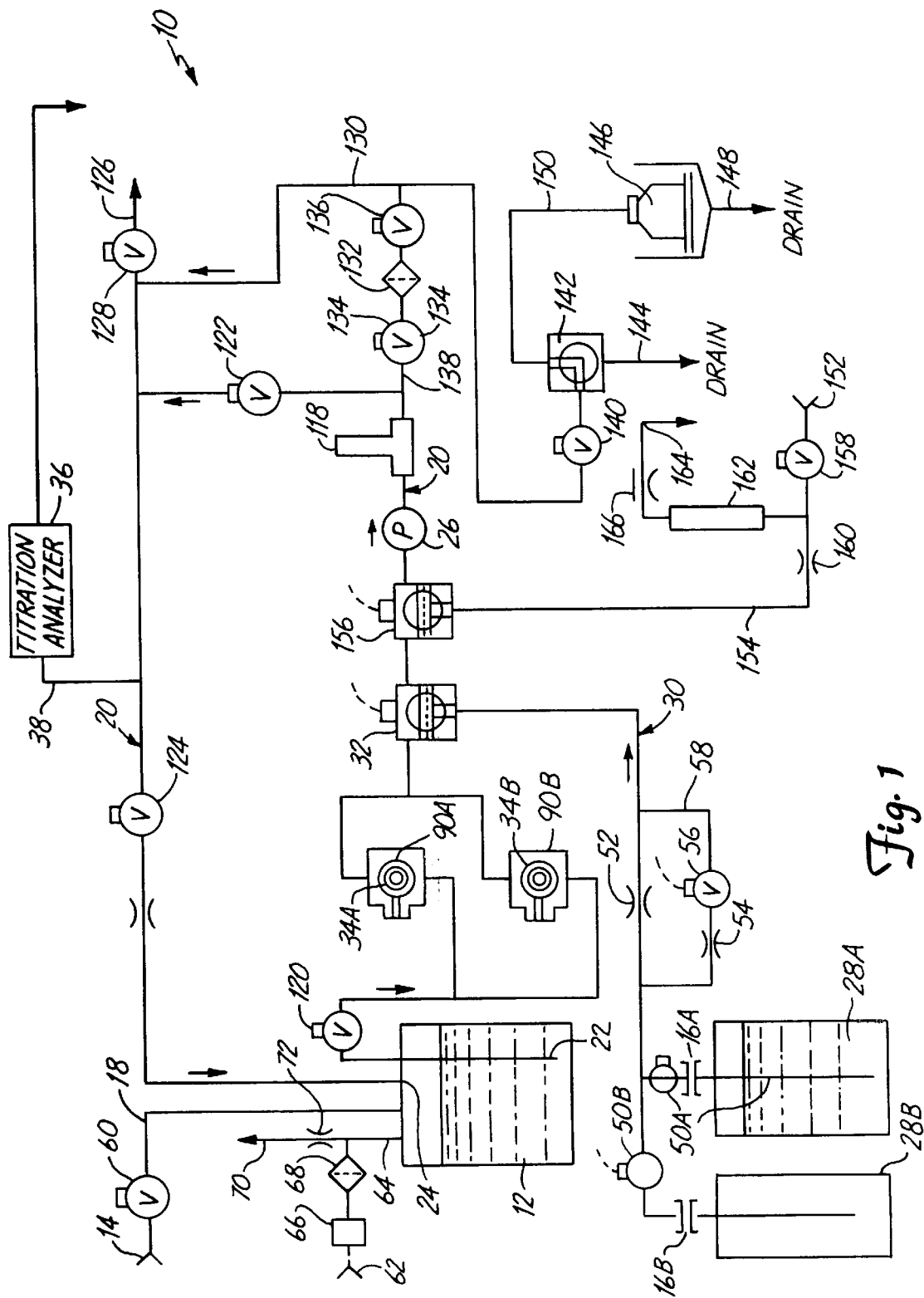
FIG. 1 is a diagrammatic illustration of a chemical blending system in accordance with the present invention.

A chemical blending system 10 in accordance with the present invention is illustrated generally in FIG. 1. For purposes of providing an overview of its operation, blending system 10 is shown as including a mixing and storage tank 12, diluent inlets 14 and 152, and concentrated chemical inlets 16A and 16B. Inlet 14 is configured to be fluidly connected to a source of diluent (i.e., a first constituent of the blended chemical) such as deionized (DI) water (not shown), and is fluidly coupled to tank 12 by diluent supply line 18. To completely mix the concentrated chemical and diluent, the blended chemical within tank 12 is recirculated by pump 26 through a recirculation line 20 having both an intake end 22 and discharge end 24 in the tank. Inlets 16A and 16B are configured to be fluidly connected to a source of concentrated chemical (i.e., a second constituent) such as supply containers 28A and 28B, and are coupled to recirculation line 20 by chemical supply line 30 and concentrate adding valve 32. Inlet 152 is also configured to be connected to a source of diluent, and is coupled to recirculation line 20 through diluent supply line 154 and diluent adding valve 156. The concentration of the blended chemical recirculating through line 20 can be quickly measured to a first and relatively coarse degree of accuracy by conductivity sensors 34A and 34B (i.e., first concentration measuring sensors). A titration analyzer 36 (i.e., a second concentration measuring sensor) is coupled to recirculation line 20 by line 38, and is capable of providing concentration measurements to a second and relatively fine degree of accuracy, although at a slower speed than sensors 34A and 34B.

Figure 2:
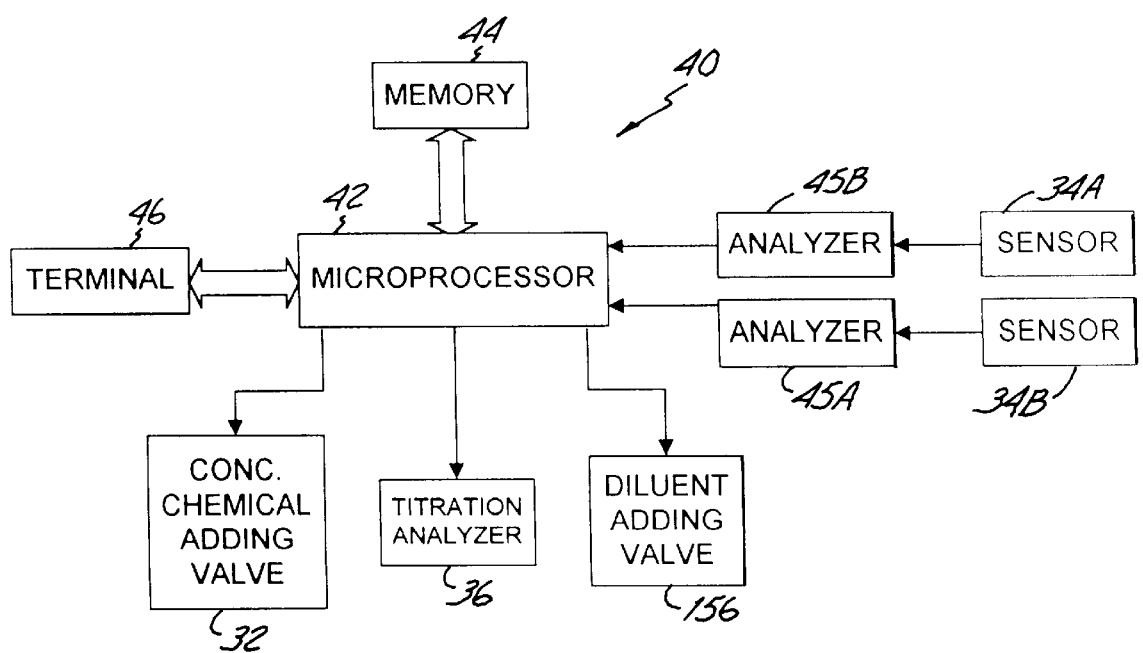
FIG. 2 is a block diagram of a programmable logic control (PLC) subsystem for operating the chemical blending system shown in FIG. 1 in accordance with the present invention.

The programmable logic control subsystem 40 used to control the operation of chemical blending system 10 is illustrated generally in FIG. 2. As shown, control subsystem 40 includes a microprocessor 42 and associated memory 44. Conductivity sensors 34A and 34B are interfaced to microprocessor 42 through analyzers 45A and 45B. Adding valves 32 and 156 and titration analyzer 36 are interfaced directly to the microprocessor 42. An operator can interface with control subsystem 40 through a terminal 46. Data representing information including concentration setpoints, process control values and a chemical blending control program is stored in memory 44. Microprocessor 42 executes the chemical blending control program as a function of the concentration setpoints, process control values and the concentration measurements made by titration analyzer 36 and sensors 34A and 34B, and in response actuates concentrate adding valve 32 and diluent adding valve 156 to regulate the flow of concentrated chemical and diluent into recirculation line 20. The chemical constituents can be quickly blended to the desired concentration with a high degree of accuracy.

The embodiment of chemical blending system 10 shown in FIGS. 1 and 2 is configured to produce blended chemicals used in semiconductor fabrication facilities. For example, concentrated tetramethyl ammonium hydroxide (TMAH) can be blended with DI water by system 10 for use as photoresist developer. In applications such as these the concentrated chemical is typically available from commercial suppliers in fifty-five gallon (about 200 liter) drums such as containers 28A and 28B. Containers 28A and 28B can be attached to and disconnected from inlets 16A and 16B, respectively, by conventional couplers (not shown). Inlets 16A and 16B are each independently connected to concentrated chemical supply line 30 through on-off solenoid valves 50A and 50B, respectively. The flow rate of concentrated chemical through supply line 30 can be regulated by orifices 52 and 54. Orifice 54 and on-off solenoid valve 56 are connected in series with one another and in a shunt line 58 around orifice 52. Orifice 54 is configured to regulate a different and typically larger flow of concentrated chemical than orifice 52. Blending system 10 can therefore be quickly reconfigured for blending different constituent chemicals and different concentration ranges of the same chemical. Additional shunt lines (not shown) can also be included to expand the concentration ranges over which system 10 can operate.

Mixing and storage tank 12 is fabricated from a material such as Teflon® PFA (perfluoroalkoxy) or ultra high molecular weight polyethylene which is resistant to corrosion by the blended chemical. The flow of diluent into tank 12 through supply line 18 is controlled by on-off solenoid valve 60. Inlet 62 is configured to be coupled to a source of process nitrogen which is used as inert tank makeup gas and to provide a blanket which separates the blended chemical from air and prevents evaporation that would result in concentration variations. Process nitrogen inlet 62 is coupled to tank 12 through a supply line 64 having a regulator 66 and filter 68. An exhaust line 70 having an orifice 72 extends from tank 12 to vent excess gas from the tank. Tank 12 has a capacity of about thirty gallons (about 110 liters) in one embodiment, although the size can vary depending upon the application of blending system 10.

Figure 3:
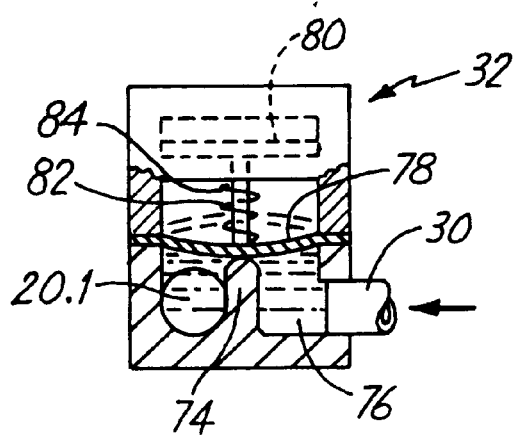
FIG. 3 is a partial cross-sectional view of the adding valves shown in FIG. 1.

Concentrated chemical adding valve 32 connects concentrated chemical supply line 30 to recirculation line 20. As shown in FIG. 1, adding valve 32 is located in recirculation line 20 between tank 12 and the suction side of pump 26. Adding valve 32 is a sample valve in the illustrated embodiment, and enables concentrated chemical to be added directly from supply line 30 into duct portion 20.1 of the valve. As shown in greater detail in FIG. 3, duct portion 20.1 of valve 32 functions as an unobstructed flow-through portion of recirculation line 20, and extends along a weir 74 which separates the duct portion from an inlet chamber 76 to which supply line 30 is connected. A diaphragm 78 is biased downwardly toward weir 74 by spring 84. An actuator such as pneumatic piston 80 is connected by a stem 82 to the diaphragm 78. Spring 84 biases diaphragm 78 to a closed position separating inlet chamber 76 from duct portion 20.1, thereby sealing concentrated chemical supply line 30 from recirculation line 20. When actuated by control subsystem 40, piston 80 lifts diaphragm 78 off the weir 74 to allow the flow of concentrated chemical from supply line 30 into recirculation line 20 where it will mix with the blended chemical then present in the recirculation line and tank 12. Adding valve 32 is capable of accurately regulating the flow of concentrated chemical into recirculation line 20 when opened, and the rate of this flow can be empirically determined. The adding valve 32 described herein is similar to that disclosed in U.S. Pat. No. 4,977,929, but modified to be actuated by a pneumatic piston to reduce dead spots that can otherwise result in quiescent quantities of concentrated chemical.

Figure 4:
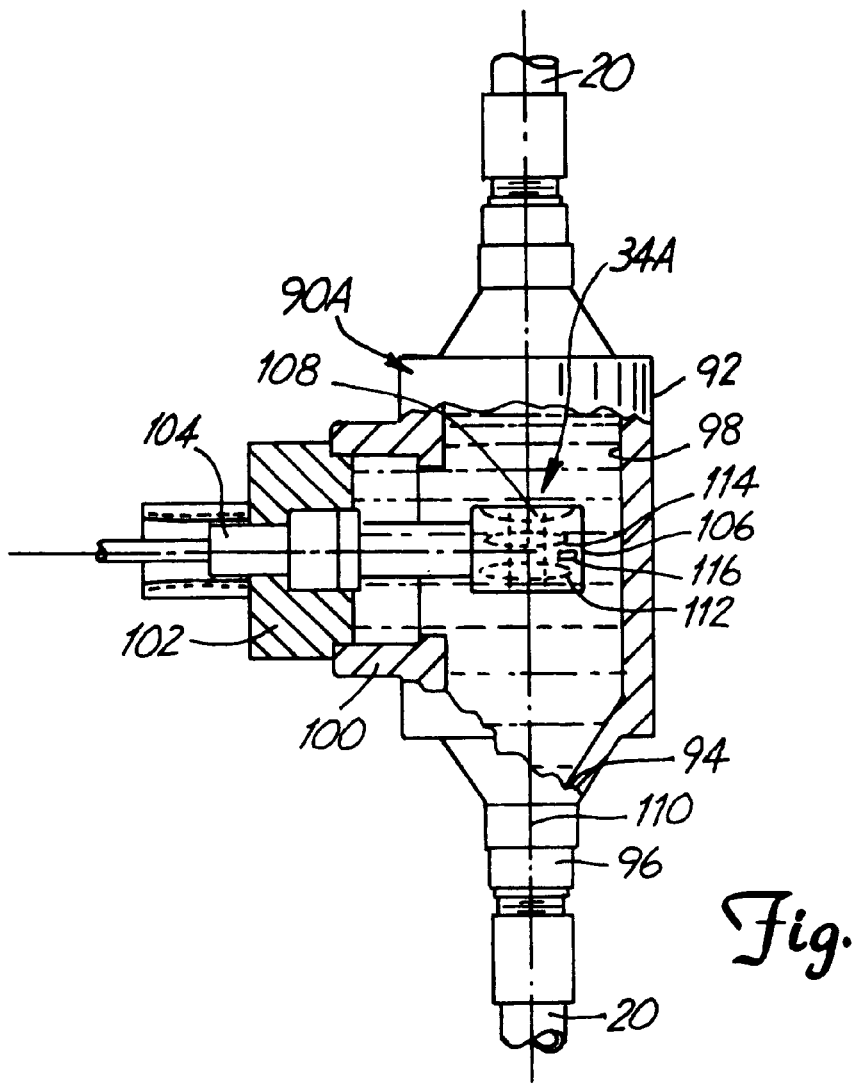
FIG. 4 is a partial cross-sectional view of the conductivity-type sensors and associated housings shown in FIG. 1.

Conductivity sensors 34A and 34B are mounted within flow housings 90A and 90B, respectively, and are connected in recirculation line 20 in a parallel hydraulic circuit between tank 12 and adding valve 32. Concentration sensor 34A, which can be identical to sensor 34B, is described in greater detail with reference to FIG. 4. As shown, sensor 34A is mounted within a housing 90A formed of PFA, PVDF or other material resistant to corrosion by the blended chemical. Housing 90A has a generally cylindrical outer wall 92, and tapered end walls 94 providing fittings to couple the housing to recirculation line 20. The nature of the material from which housing 90A is fabricated and the smooth inner surfaces 98 of wall 92 tend to minimize the collection of gas bubbles on the housing as the blended chemical flows therethrough.

Sensor 34A includes a stem 104 extending through a mounting plug 102. Mounting plug 102 is welded or otherwise secured to a T-shaped opening 100 in housing 90A. Sensor 34A also includes a sensing head 106 on the end of stem 104 within housing 90A. Sensing head 106 is annular in shape and has a central opening 108 axially aligned with the centerline 110 of housing 90A. Blended chemical flowing through housing 90A therefore flows through the central opening 108 of sensor 34A as well. Sensor 34A also includes a temperature sensor 116 which is coupled to control subsystem 40 to provide a temperature signal representative of the temperature of the blended chemical flowing through the sensor.

Sensing head 106 and stem 104 can be molded as an integral unit from PFA, PVDF or other corrosion-resistant material. A pair of coils 112 and 114 and associated lead wires which extend from stem 104 (not shown in FIG. 4) are embedded within head 106 and the stem while they are being molded. Coils 112 and 114 surround the central opening 108 of head 106. As with housing 90A, the material from which stem 104 and head 106 are fabricated and the smooth surfaces of these components minimizes the collection of gas bubbles on sensor 34A as the blended chemical flows through and by the sensor.

As shown in FIG. 2, sensors 34A and 34B are interfaced to microprocessor 42 through analyzers 45A and 45B, respectively. Analyzers 45A and 45B drive sensors 34A and 34B, and process signals received from the sensors to generate digital concentration values representative of the weight % concentration of the blended chemical flowing past the sensors. Analyzers such as 45A and 45B are well known and commercially available from a number of manufacturers such as Great Lakes Instruments of Milwaukee, Wis. Briefly, and with reference to sensor 34A illustrated in FIG. 4, coil 112 is energized by an AC drive signal from analyzer 45A to create an inductive field. The inductive field establishes an electric current in the blended chemical flowing by sensor head 106. The magnitude of the electric current established in the blended chemical is directly related to the conductivity, and therefore concentration, of the blended chemical. The current established in the blended chemical induces a sense current signal in coil 114, and the magnitude of the sense current signal is also directly related to the conductivity and concentration of the blended chemical. The sense current signal is digitized by analyzer 45A to produce an uncompensated digital conductivity value.

Analyzer 45A includes stored conductivity-concentration data (e.g., in the form of lookup table) which relates the monitored conductivity values of the blended chemical to the weight % concentration values of the blended chemical at a predetermined temperature (e.g., 25° C.). The relationship between the conductivity values generated by sensor 34A and the actual concentration of the blended chemical is also dependant upon the temperature of the blended chemical. Analyzer 45A therefore also includes temperature compensation data characterizing the relationship between conductivity values at the temperature for which the conductivity-concentration data is established, and the actual temperature of the blended chemical. The uncompensated digital conductivity value is processed by analyzer 45A as a function of the measured temperature of the blended chemical and the temperature compensation data to generate compensated digital conductivity values. Using the compensated digital conductivity value as an input, analyzer 45A then accesses the conductivity-concentration data to generate a compensated digital concentration value in units of weight %. The compensated digital concentration values generated by analyzer 45A are provided to microprocessor 42.

Microprocessor 42 continuously compares the concentration values generated from the sensors 34A and 34B, and performs a deviation analysis to monitor the operation of the sensors. If sensors 34A and 34B are both operating properly, the concentration values generated by these sensors will be equal to one another within a predetermined range of deviation. If the concentration measurements based upon the conductivity readings from sensors 34A and 34B are equal to one another within the predetermined range of deviation, microprocessor 42 will use one of the concentration measurements to control the operation of blending system 10. If at any time microprocessor 42 determined that the concentration values are not equal (i.e., if excess deviation exists), control subsystem 40 will stop or discontinue the operation of blending system 10, and provide a corresponding error message on terminal 46. Blending system 10 and/or control subsystem 40 can then be serviced to identify and repair the fault.

Referring back to FIG. 1, a surge suppressor 118 can be included in recirculation line 20 immediately downstream from pump 26. On-off solenoid valves 120, 122 and 124 are also included in recirculation line 20 in the illustrated embodiment of blending system 10. Valve 120 is located between the intake end 22 of recirculation line 20 and sensors 34A and 34B. Valves 122 and 124 are in series with one another between surge suppressor 118 and the discharge end 24 of the recirculation line 20.

Blended chemical from system 10 is delivered to its point of use through discharge line 126. In the embodiment shown, discharge line 126 is coupled to recirculation line 20 at a point between valves 122 and 124. An on-off solenoid valve 128 can be used to control the discharge of blended chemical through line 126.

A filter line 130 is connected in parallel with valve 122. As shown, filter line 130 includes a filter 132, and on-off solenoid valves 134 and 136. Valves 134 and 136 are positioned on opposite sides of filter 132.

A drain and sample collecting line 138 is connected to the recirculation line 20 between valves 122 and 124, and includes on-off solenoid valve 140 and two-way valve 142. A first outlet port of two-way valve 142 is connected to drain line 144. A second outlet port of valve 142 is coupled to sample bottle 146 and associated drain line 148 through sample line 150. When actuated by control subsystem 40, two-way valve 142 can connect the drain and sample collecting line 138 to either drain line 144 or sample line 150.

As described above, diluent inlet 152 is coupled to recirculation line 20 through diluent line 154 and adding valve 156. Adding valve 156 can be identical to valve 32 described above and is located in recirculation line 20 between concentrate adding valve 32 and pump 26 in the embodiment shown. Since diluent adding valve 156 is positioned adjacent to the suction side of pump 26, diluent from supply line 154 will be drawn into recirculation line 20 when the diluent adding valve is open. Adding valve 156 is capable of accurately regulating the flow of diluent into recirculation line 20 when opened, and the rate of this flow can be empirically determined.

On-off solenoid valve 158 and orifice 160 are included in diluent line 154 to control and regulate the flow of diluent to valve 156. The embodiment of blending system 10 shown in FIG. 1 also includes a column 162 coupled to line 154 between valve 158 and orifice 160. Column 162 is connected to a drain line 164 through orifice 166. In practice, column 162 can be periodically replenished with diluent by opening valve 158, thereby maintaining a fresh supply of diluent within the column for subsequent addition to the blended chemical in recirculation line 20 through the diluent adding valve. Alternatively, DI water can be continuously added to column 162, and allowed to overflow, to minimize bacteria growth.

Titration analyzers such as 36 are well known and commercially available from a number of sources such as Applikon Dependable Instruments bv of the Netherlands, through its North American distributer Applikon Analyzers, Inc. of Kingwood Tex. When actuated by control subsystem 40, titration analyzer 36 initiates an analysis cycle by drawing a sample of blended chemical from recirculation line 20. The sample is then titrated with reagents and its pH or pH inflection point measured to determine the concentration of the blended chemical sample. Analyzers such as 36 can also implement other titration techniques to measure concentrations of various components of the sample. A signal representative of the concentration of the blended chemical is provided to control subsystem 40 by titration analyzer 36 at the end of the titration analysis cycle. Titration analyzers such as 36 have a relatively slow response time (e.g., 3–5 minutes) compared to the nearly instantaneous concentration measurements that can be obtained through the use of conductivity sensors 34A and 34B, but are capable of providing concentration measurements to a higher degree of accuracy than those obtained from the conductivity sensors (e.g., less than about 0.10% relative error at three standard deviations or $3\sigma$).

Figure 5B:
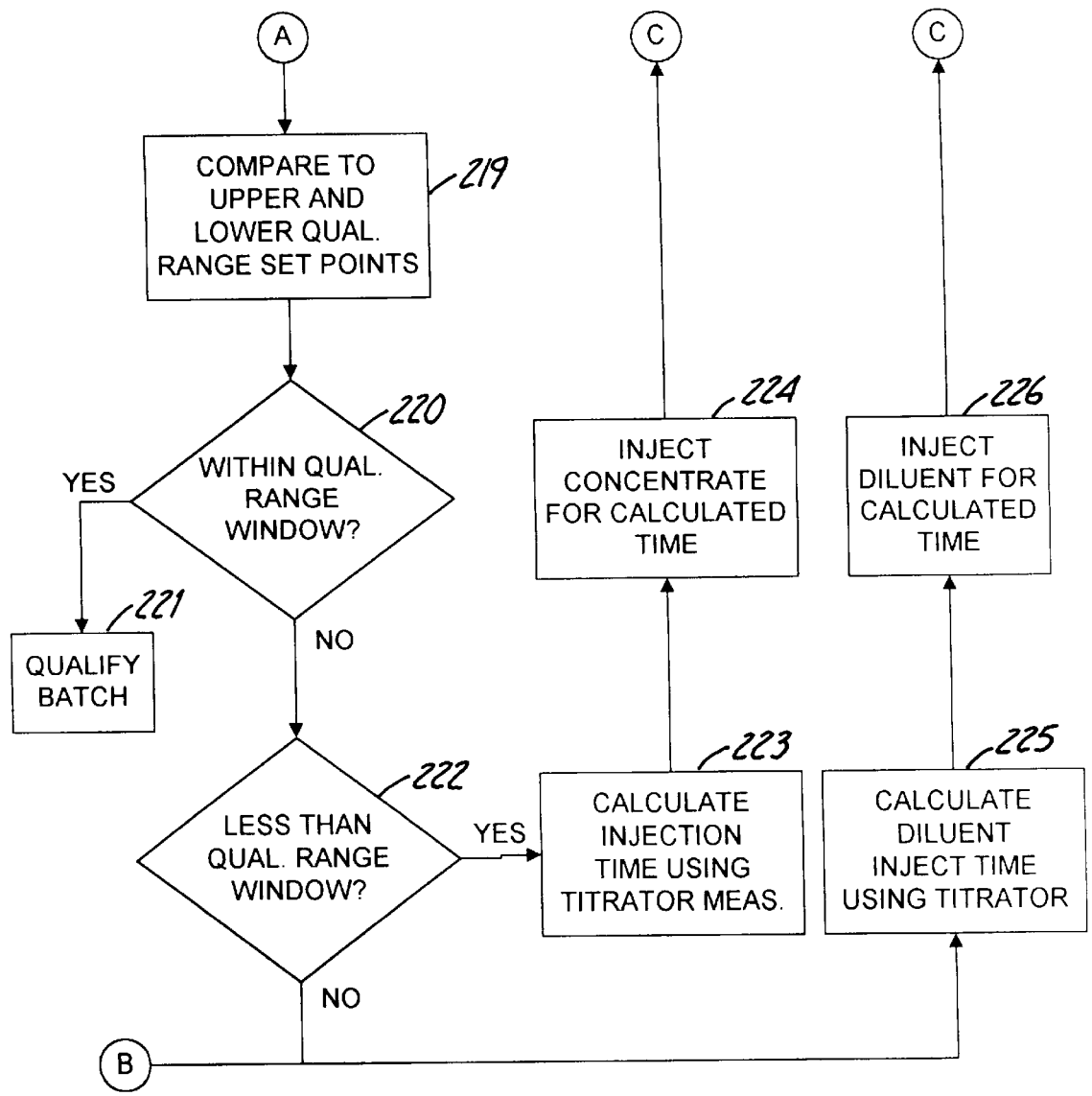

The manner by which control subsystem 40 operates blending system 10 to blend diluent with concentrated chemical to obtain blended chemical having the desired concentration can be described generally with reference to FIGS. 2 and 5. The blending control program executed by microprocessor 42 to control the operation of concentrate adding valve 32, diluent adding valve 156 and titration analyzer 36 is stored in memory 44. Also stored in memory 44 is data characterizing a number of setpoints and process control values used by the blending control program. The setpoints and process control values are dependant on the specific type and concentration of blended chemical being produced by blending system 10 (e.g., on the type of diluent and concentrated chemical) and the blending algorithm being implemented by the blending control program. In the embodiment described herein, blended chemical concentration is described in terms of weight percent (weight %) of concentrated chemical in the blended chemical. Accordingly, the setpoints and process control values are referenced to units of weight %. The blending control program executed by the embodiment of control subsystem 40 described herein makes use of the following setpoints and process control values.

1. Desired Qualification Setpoint
2. Upper Qualification Range Setpoint
3. Lower Qualification Range Setpoint
4. Coarse Blend Setpoint
5. Fine Blend Setpoint
6. Concentrate Injection Constant
7. Diluent Injection Constant The Desired Qualification Setpoint is a value representing the desired or nominal blended chemical concentration. An operator will typically enter the Desired Qualification Setpoint into control subsystem 40 through terminal 46. The Upper and Lower Qualification Range Setpoints are blended chemical concentrations above and below the Desired Qualification Setpoint, respectively, that represent an acceptable window or range of final blended chemical concentrations. The Upper and Lower Qualification Range Setpoints can be programmed directly into control subsystem 40 through terminal 46. Alternatively, a percent composition error value or other specification describing a range of acceptable blended chemical concentrations can be programmed into control subsystem 40, and used by the control subsystem, along with the Desired Qualification Setpoint, to compute the Upper and Lower Qualification Range Setpoints.

The Coarse Blend Setpoint is a value representing a blended chemical concentration that is used to control the initial injection or addition of concentrated chemical into the recirculation line 20. As is described in greater detail below, during the initial operation of blending system 10, concentrated chemical is continuously added to the recirculation line 20 to quickly increase the concentration of the blended chemical as long as the concentration measurements provided by conductivity sensors 34A and 34B indicate that the blended chemical concentration is less than the Coarse Blend Setpoint. The Coarse Blend Setpoint therefore represents a concentration which is sufficiently less than the Desired Qualification Setpoint that the actual blended chemical concentration will approach, but not exceed or overshoot, the Desired Qualification Setpoint if the addition of concentrated chemical is stopped when the concentration measurements provided by sensors 34A and 34B indicate that the blended chemical concentration has increased to the Coarse Blend Setpoint. The Coarse Blend Setpoint can be empirically determined by observing the operation of blending system 10, and programmed into control subsystem 40 through terminal 46.

The Fine Blend Setpoint is a value representing a blended chemical concentration which is greater than the Coarse Blend Setpoint, but less than the Lower Qualification Range Setpoint. The Fine Blend Setpoint is used to determine whether concentration measurements based on conductivity sensors 34A and 34B or titration analyzer 36 will be used for subsequent process control operations implemented by control subsystem 40. The Fine Blend Setpoint can be empirically determined and programmed into control subsystem 40 through terminal 46.

The Concentrate Injection Constant is a process value characterizing the relationship between a parameter of blending system 10 that can be controlled by control subsystem 40, and corresponding changes to the concentration of the blended chemical. In the embodiment of blending system 10 described herein, the concentrate Injection Constant is representative of the relationship between the length of time that concentration adding valve 32 is actuated and associated changes (increases) in the blended chemical concentration. In particular, the Concentrate Injection Constant is a value characteristic of weight % increases in blended chemical concentration per second that adding valve 32 is open (i.e., in units of wt %/sec). The Concentrate Injection Constant can be empirically determined and programmed into control subsystem 40 through terminal 46. As described in greater detail below, control subsystem 40 can also update the Concentration Injection Constant on the basis of monitored changes in concentration to increase the accuracy of blending system 10.

The Diluent Injection Constant is also a process value characterizing the relationship between a parameter of blending system 10 that can be controlled by subsystem 40, and corresponding changes to the concentration of the blended chemical. In the embodiment of blending system 10 described herein, the Diluent Injection Constant is representative of the relationship between the length of time that diluent adding valve 156 is actuated and associated changes (decreases) in the blended chemical concentration. In particular, the Diluent Injection Constant is a value characteristic of weight % decreases in blended chemical concentration per second that adding valve 156 is open (i.e., in units of wt %/sec).

FIG. 5 is a flow diagram of the method by which blending system 10 is operated by control subsystem 40 to quickly and accurately mix diluent and concentrated chemical in tank 12 and recirculation line 20, and generate blended chemical having a concentration between the Upper and Lower Qualification Range Setpoints. When used in semiconductor fabrication applications, blending system 10 will typically produce blended chemicals having less concentrated chemical than diluent (i.e., a relatively low weight % of concentrated chemical). As shown at step 200, microprocessor 42 therefore begins the blending process by opening valve 60 to fill tank 12 with a desired amount of diluent. Once tank 12 has been filled, valve 60 is closed. Pump 26 is then actuated to continually recirculate the diluent through tank 12 and recirculation line 20. Before initiating subsequent steps of the blending method shown in FIG. 5, pump 26 is allowed to recirculate the blended chemical (or initially only the diluent) for a predetermined length of time to thoroughly mix the diluent and concentrated chemical and generate a homogeneous blended chemical. This mixing step is shown at 201 in FIG. 5.

After the mixing operation at step 201, the concentration of the blended chemical within tank 12 and recirculation line 20 is continuously measured by microprocessor 42 using readings provided by conductivity sensors 34A and 34B. This measurement is shown at step 202. The measured concentration is then compared to the setpoints including the Desired Qualification Setpoint, Upper and Lower Qualification Range Setpoints, and the Coarse and Fine Blend Setpoints. This comparison is indicated by step 203 in FIG. 5.

If the comparison performed at step 203 indicates that the blended chemical concentration is less than the Coarse Blend Setpoint (decision step 204) (e.g. at the beginning of the blend cycle), microprocessor 42 either opens concentrate adding valve 32, or keeps the valve open, to continuously inject or add concentrated chemical to recirculation line 20. This step is shown at 205 in FIG. 5 and results in the mixture of the added concentrate with the blended chemical within the recirculation line 20. Steps 202–205 are then continuously repeated as shown in FIG. 5 until the measured concentration of the blended chemical reaches the Coarse Blend Setpoint. The continuous injection of concentrated chemical in this manner will cause the concentration of the blended chemical to relatively quickly increase to the value represented by the Coarse Blend Setpoint.

After the comparison performed at step 203 indicates that the concentration of the blended chemical has increased to a value which is greater than or equal to the Coarse Blend Setpoint, but less than or equal to the Fine Blend Setpoint (decision step 206), microprocessor 42 closes the concentrate adding valve 32. Microprocessor 42 then calculates the length of time that concentrate adding valve 32 should be opened to inject or add enough concentrated chemical to recirculation line 20 to increase the blended chemical concentration to the Fine Blend Setpoint. These steps are shown generally at 207 and 208 in FIG. 5. In particular, at step 207 microprocessor 42 computes the difference between the Fine Blend Setpoint and the most recent measurement of the blended chemical concentration at step 202. This difference, in weight % of concentrated chemical, is then divided by the Concentrate Injection Constant to compute the length of time that the concentrate adding valve 32 should be opened. As shown at step 208, microprocessor 42 then opens concentrate adding valve 32 for the computed concentrate inject time in an attempt to increase the concentration of the blended chemical to the Fine Blend Setpoint. Upon the completion of step 208, the blending procedure described above is repeated beginning with step 201.

If the comparison performed at step 203 indicates that the measured concentration is greater than the Fine Blend Setpoint but less than or equal to the Upper Qualification Range Setpoint as shown at decision step 209, microprocessor 42 actuates titration analyzer 36, thereby causing the titration analyzer to take a sample and measure the concentration of the blended chemical. This action of the titration analyzer 36 is shown at step 218 in FIG. 5. Microprocessor 42 then compares the blended chemical concentration value provided by titration analyzer 36 to the Upper and Lower Qualification Range Setpoints at step 219. If the comparison performed at step 219 indicates that the concentration is within the qualification range window (decision step 220) (e.g., greater than or equal to the Lower Qualification Range Setpoint but less than or equal to the Upper Qualification Range Setpoint), the blending process is complete and the batch of blended chemical is qualified for subsequent use as indicated by step 221.

If the comparison performed at step 219 indicates that the blended chemical concentration is still less than the Lower Qualification Range Setpoint (decision step 222), microprocessor 42 will calculate the length of time that concentrate adding valve 32 should be opened to inject or add enough concentrated chemical to recirculation line 20 to increase the blended chemical concentration to the Desired Qualification Setpoint. These steps are shown generally at 223 and 224 in FIG. 5. In particular, at step 223 microprocessor 42 computes the difference between the Desired Qualification Setpoint and the most recent measurement of the blended chemical concentration at step 218. This difference, in weight %, is then divided by the Concentrate Injection Constant to compute the length of time that the concentrate adding valve 32 should be opened. As shown at step 224, microprocessor 42 then opens concentrate adding valve 32 for the computed concentrate inject time in an attempt to increase the concentration of the blended chemical to the Desired Qualification Setpoint. Upon completion of step 224, the blended chemical is recirculated and mixed for a predetermined length of time (step 217), and the blending procedure described above is repeated beginning with step 218.

Concentration measurements provided by titration analyzer 36 are very accurate. The Concentrate Injection Constant also accurately characterizes the changes in blended chemical concentration that can be obtained by actuating concentrate adding valve 32. For these reasons, blending control subsystem 40 will typically need to perform concentrated chemical additions based on concentration measurements provided by titration analyzer 36 (steps 223 and 224) only once before the batch of blended chemical is qualified at step 221. If for any reason, however, the comparison performed at step 219 indicates that the measured concentration is greater than the Upper Qualification Range Setpoint, microprocessor 42 will calculate the length of time that diluent adding valve 156 should be opened to inject or add enough diluent to recirculation line 20 to decrease the blended chemical concentration to the Desired Qualification Setpoint. These steps are shown generally at 225 and 226 in FIG. 5. In particular, at step 225 microprocessor 42 computes the difference between the Desired Qualification Setpoint and the most recent measurement of the blended chemical concentration at step 218. This difference, in weight %, is then divided by the Diluent Injection Constant to compute the length of time that the diluent adding valve 156 should be opened. As shown at step 226, microprocessor 42 then opens diluent adding valve 32 for the computed diluent inject time in an attempt to decrease the concentration of the blended chemical to the Desired Qualification Setpoint. Upon completion of step 226, the blending procedure described above is repeated beginning with step 217, until the blended chemical is qualified at step 221.

The accuracy of the chemical blending procedure performed by system 10 and control subsystem 40 can be increased by updating the Concentrate Injection Constant and/or the Diluent Injection Constant as a function of the actual blended chemical concentration changes induced by the injection of concentrated chemical at steps 208 and 224 or the injection of diluent at step 226. By way of example, both before and after the injection of concentrated chemical at step 224, the concentration of the blended chemical will be measured at step 218. Control subsystem 40 can therefore compute an effective concentrate injection constant by taking the difference between the measured concentration values before and after the injection of concentrated chemical at the associated step 224, and dividing this difference by the length of time that concentrate adding valve 32 was opened to achieve that concentration change during the associated step 224. The current value of the Concentrate Injection Constant stored in memory 44 can then be updated by control system 40 as a function of the currently stored value and the just-computed effective concentrate injection constant. This update calculation can be performed as a function of running and/or weighted averages of the just-calculated effective concentrate injection constant, the currently stored value of the Concentrate Injection Constant, and any number of previous concentrate injection constants. Procedures of this type can also be used to update the Concentrate Injection Constant after the performance of step 208, and to update the Diluent Injection Constant after the performance of step 226.

An alternative embodiment of blending system 10 (not shown) does not include diluent adding valve 156 or other associated elements such as inlet 152 and supply line 154 which enable the controlled addition of diluent. Accordingly, the control subsystem 40 in this embodiment is not programmed to decrease the blended chemical concentration by performing steps 225 and 226. In this embodiment the control subsystem 40 can calculate the concentration injection time at steps 207 and 223 using a "target" concentration less than the Desired Qualification Setpoint by a predetermined amount. This approach minimizes the chances that control subsystem 40 will "overshoot" the Upper Qualification Range Setpoint when performing concentrated chemical addition steps 208 and 224 in this embodiment, and therefore be incapable of subsequently reducing the blended chemical concentration to qualify the batch at step 221.

Figure 6:
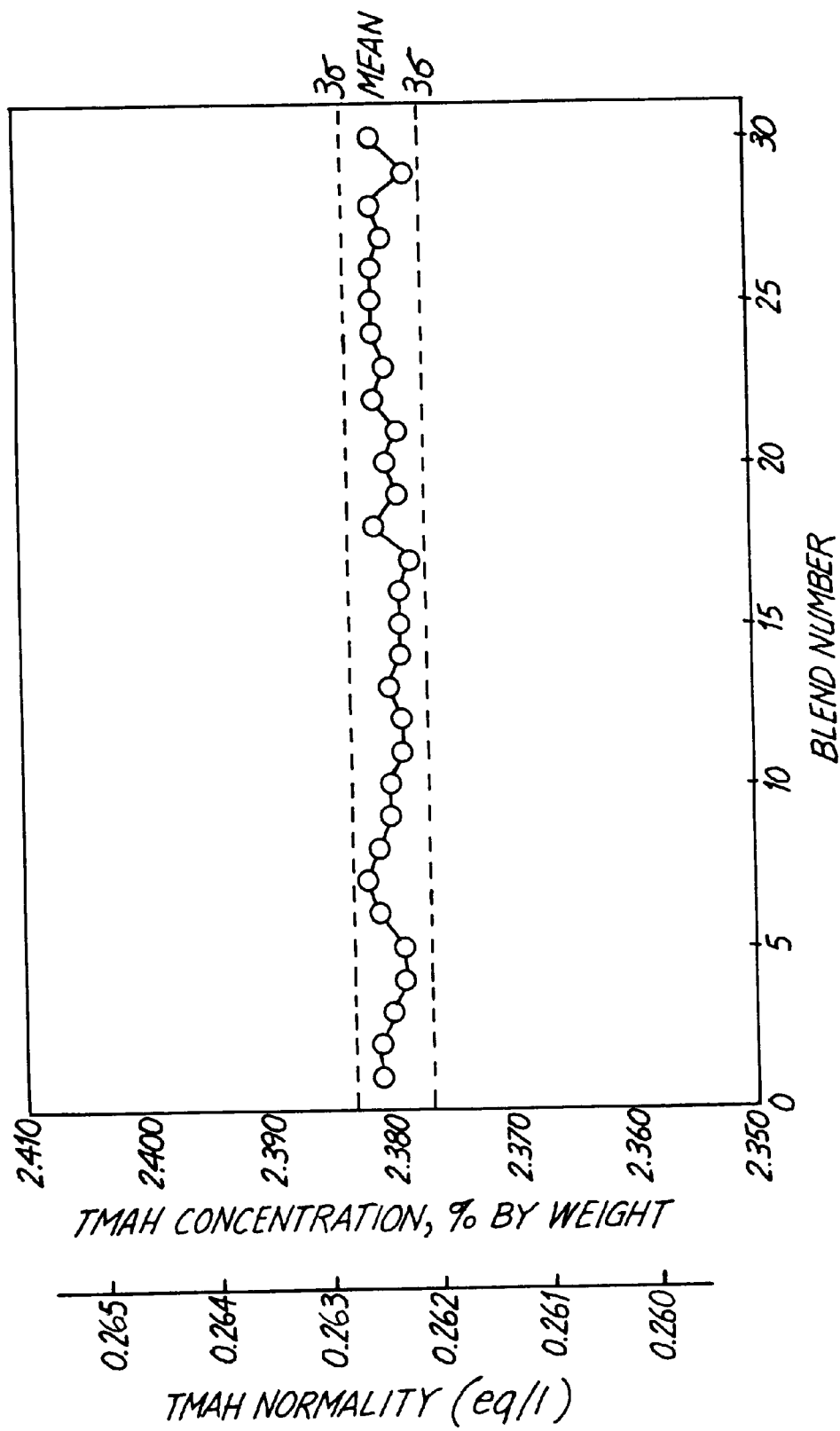
FIG. 6 is a graph of TMAH concentrations obtained during thirty blend cycle tests of a prototype of the present invention.

Chemical blending system 10 and the associated control subsystem 40 offer considerable advantages. In particular, the system and subsystem are capable of quickly blending constituents to the desired degree of concentration. The control subsystem can be programmed to blend these constituents to any of a wide range of concentrations. Furthermore, these batches of chemical can be blended to a very high degree of accuracy. By way of example, a prototype of chemical blending system 10 that did not include diluent adding valve 156 or the capability of injecting diluent to reduce concentration was configured to blend concentrated TMAH (25% by weight) with DI water to a nominal or desired concentration of 2.38 weight percent. Thirty twenty-five gallon batches of TMAH were blended. FIG. 6 is a graph of the final blend concentrations that were achieved. The relative error of this blending system at three standard deviations is ±0.13%.

Although the present invention has been described with reference to preferred embodiments, those skilled in the art will recognize that changes can be made in form and detail without departing from the spirit and scope of the invention. In particular, although described as a system for blending two constituents, the invention can also be used to quickly and accurately blend three or more constituents to desired concentrations. Also, although described in connection with a system for blending water with chemicals, the invention can also be used to blend non-aqueous constituents.

What is claimed is:

1. A chemical blending system for blending at least first and second chemical constituents to obtain blended chemical having a desired chemical concentration, including:

a first constituent inlet for receiving a first chemical constituent;

a second constituent inlet for receiving a second chemical constituent;

a blending tank fluidly coupled to the first and second constituent inlets, for receiving the chemical constituents and holding the blended chemical;

a recirculation line having an inlet and an outlet in the blending tank;

pump means having a suction end and a pressure end in the recirculation line, for recirculating blended chemical from the blending tank through the recirculation line to blend the chemical constituents;

at least a first regulating mechanism coupling the first constituent inlet to the recirculation line between the recirculation line inlet and the suction end of the pump means, for regulating the amount of at least the first chemical constituent supplied to the recirculation line;

a first concentration measuring instrument having first operating characteristics, for measuring concentration of the blended chemical in the blending tank;

a second concentration measuring instrument having second operating characteristics different than the first operating characteristics, for measuring concentration of the blended chemical in the blending tank;

memory for storing digital data representative of:
    a blending control program; and
    a concentration qualification range representative of chemical concentrations within a qualification range of the desired chemical concentration; and a digital processor coupled to the memory, first and second concentration measuring instruments and to the first regulating mechanism, for executing the blending control program and controlling at least the first regulating mechanism as a function of the concentration measurements provided by the first and second concentration measuring instruments to blend the first and second chemical constituents to a concentration within the qualification range.

2. The chemical blending system of claim 1 wherein:
the system further includes a second regulating mechanism coupling a source of the second chemical constituent to the recirculation line between the recirculation line inlet and the suction end of the pump means, for regulating the amount of the second chemical constituent supplied to the recirculation line; and the digital processor is coupled to the second regulating mechanism, and controls the first and second regulating mechanisms as a function of the concentration measurements provided by the first and second concentration measuring instruments to blend the first and second chemical constituents to a concentration within the qualification range.

3. The chemical blending system of claim 1 wherein:
the memory further includes memory for storing digital data representative of first constituent injection information characterizing the relationship between a controlled parameter of the first regulating mechanism and expected corresponding changes in the concentration of the blended chemical; and the digital processor controls the first regulating mechanism as a function of the first constituent injection information and differences between the concentration measurements provided by the first and second concentration measuring instruments and the desired chemical concentration.

4. The chemical blending system of claim 3 wherein:
the system further includes a second regulating mechanism coupling a source of the second chemical constituent to the recirculation line between the recirculation line inlet and the suction end of the pump means, for regulating the amount of the second chemical constituent supplied to the recirculation line;

the memory further includes memory for storing digital data representative of second constituent injection information characterizing the relationship between a controlled parameter of the second regulating mechanism and expected corresponding changes in the concentration of the blended chemical; and the digital processor is coupled to the second regulating mechanism, and controls the second regulating mechanism as a function of the second constituent injection information and differences between the concentration measurements provided by the first and second concentration measuring instruments and the desired chemical concentration to blend the first and second chemical constituents to a concentration within the qualification range.

5. The chemical blending system of claim 4 wherein the digital processor further includes:
first update means for updating the first constituent injection information as a function of the difference between expected changes in blended chemical concentrations caused by control of the first regulating mechanism, and actual changes in the blended chemical concentrations caused by control of the first regulating mechanism; and second update means for updating the second constituent injection information as a function of the difference between expected changes in blended chemical concentrations caused by control of the second regulating mechanism, and actual changes in the blended chemical concentrations caused by control of the second regulating mechanism.

6. The chemical blending system of claim 3 wherein the digital processor further includes means for updating the first constituent injection information as a function of the difference between expected changes in blended chemical concentrations caused by control of the first regulating mechanism, and actual changes in the blended chemical concentrations caused by control of the first regulating mechanism.

7. The chemical blending system of claim 1 wherein the first concentration measuring instrument includes measurement means for providing a relatively fast measurement response time with respect to the response time operating characteristics of the second concentration measuring instrument.

8. The chemical blending system of claim 7 wherein the first concentration measuring instrument includes measurement means for providing a substantially instantaneous measurement response time.

9. The chemical blending system of claim 7 wherein the first concentration measuring instrument includes a conductivity-type measuring instrument.

10. The chemical blending system of claim 1 wherein the second concentration measuring instrument includes measurement means for providing a relatively high degree of measurement accuracy with respect to the degree of measurement accuracy operating characteristics of the first concentration measuring instrument.

11. The chemical blending system of claim 10 wherein the second concentration measuring instrument includes a titration analyzer measuring instrument.

12. A chemical blending system for blending at least first and second chemical constituents to produce blended chemical having a desired chemical concentration within a qualification range, including:
a first constituent inlet for receiving the first chemical constituent;

a second constituent inlet for receiving the second chemical constituent;

blending apparatus fluidly coupled to the first and second constituent inlets, for receiving and blending the first and second chemical constituents to produce the blended chemical;

a first regulating mechanism for regulating the amount of at least one of the chemical constituents received by the blending apparatus;

a first concentration measuring instrument having first operating characteristics, for measuring concentration of the blended chemical in the blending apparatus;

a second concentration measuring instrument having second operating characteristics different than the first operating characteristics, for measuring concentration of the blended chemical in the blending apparatus; and a control system coupled to the first and second concentration measuring instruments for controlling the first regulating mechanism, including:
first control means for actuating the first regulating mechanism to control chemical blending as a function of concentration measurements from the first concentration measuring instrument when the measured concentration is less than a first blend concentration set point which is less than the qualification range;

second control means for actuating the first regulating mechanism to control chemical blending as a function of concentration measurements from the second concentration measuring instrument when the measured concentration is greater than the first blend concentration setpoint and less than a lower qualification range setpoint of the qualification range; and third control means for qualifying the blended chemical by causing the first regulating mechanism to discontinue the receipt of the chemical constituents when the concentration measurements from the second concentration measuring instrument are within the qualification range.

13. The chemical blending system of claim 12 and further including fourth control means for actuating the first regulating mechanism as a function of concentration measurements from the first concentration measuring instrument when the measured concentration is less than a second blend concentration setpoint which is less than the first blend concentration setpoint.

14. The chemical blending system of claim 12 wherein:
the control system further includes stored first constituent injection information characterizing a relationship between a controlled parameter of the first regulating mechanism and expected corresponding changes in the concentration of the blended chemical;
the first control means includes means for actuating the first regulating mechanism as a function of the first constituent injection information and the difference between the concentration measurements from the first measuring instrument and the desired concentration, to add a finite quantity of the chemical constituent to the blending apparatus in an attempt to increase the blended chemical concentration to a concentration within the qualification range; and
the second control means includes means for actuating the first regulating mechanism as a function of the first constituent injection information, and the difference between the concentration measurements from the second measuring instrument and the desired concentration, to add a finite quantity of the chemical constituent to the blending apparatus in an attempt to increase the blended chemical concentration to a concentration within the qualification range.

15. The chemical blending system of claim 14 wherein the control system further includes first update means for updating the first constituent injection information as a function of the difference between expected changes in blended chemical concentration caused by control of the first regulating mechanism, and actual changes in the blended chemical concentration caused by control of the first regulating mechanism.

16. The chemical blending system of claim 14 and further including fourth control means for actuating the first regulating mechanism to continuously add the chemical constituent to the blending apparatus when the measured concentration is less than a second blend concentration setpoint which is less than the first blend concentration setpoint, in an attempt to increase the blended chemical concentration to a concentration which is greater than or equal to the second blend concentration setpoint.

17. The chemical blending system of claim 12 and further including:
a second regulating mechanism for regulating the amount of a second chemical constituent received by the blending apparatus; and
second regulating mechanism control means for actuating the second regulating mechanism to control chemical blending as a function of concentration measurements from at least one of the first and second measuring instruments when the measured concentration is greater than the qualification range.

18. The chemical blending system of claim 17 wherein the control system further includes stored second constituent injection information characterizing a relationship between a controlled parameter of the second regulating mechanism and expected corresponding changes in the concentration of the blended chemical, and the second regulating mechanism control means includes means for actuating the second regulating means as a function of second constituent injection information and the difference between the concentration measurements from the measuring instrument and the desired concentration, to add a finite quantity of the second chemical constituent to the blending apparatus in an attempt to decrease the blended chemical concentration to a concentration within the qualification range.

19. The chemical blending system of claim 18 and further including second update means for updating the second constituent injection information as a function of the difference between expected changes in blended chemical concentration caused by control of the second regulating mechanism, and measured changes in the blended chemical concentration caused by control of the second regulating mechanism.

20. The chemical blending system of claim 12 wherein the first concentration measuring instrument includes measurement means for providing a relatively fast measurement response time with respect to the response time operating characteristics of the second concentration measuring instrument.

21. The chemical blending system of claim 20 wherein the first concentration measuring instrument includes measurement means for providing a substantially instantaneous measurement response time.

22. The chemical blending system of claim 12 wherein the first concentration measuring instrument includes a conductivity-type measuring instrument.

23. The chemical blending system of claim 12 wherein the second concentration measuring instrument includes measurement means for providing a relatively high degree of measurement accuracy with respect to the degree of measurement accuracy operating characteristics of the first concentration measuring instrument.

24. The chemical blending system of claim 12 wherein the second concentration measuring instrument includes a titration analyzer measuring instrument.

25. The chemical blending system of claim 12 wherein:
the blending apparatus includes:
a blending tank fluidly coupled to the first and second constituent inlets, for receiving the chemical constituents and holding the blended chemical;
a recirculation line having an inlet and an outlet in the blending tank; and
pump means having a suction end and a pressure end in the recirculation line, for recirculating blended chemical from the blending tank through the recirculation line to blend the chemical constituents; and
the first regulating mechanism couples the first constituent inlet to the recirculation line between the recirculation line inlet and the suction end of the pump means.

26. The chemical blending system of claim 25 wherein the first regulating mechanism includes a valve.

27. The chemical blending system of claim 12 wherein the first control means, second control means and third control means include digital control means and associated memory.

28. A chemical blending system for blending concentrated chemical with a diluent to obtain blended chemical having a desired chemical concentration within a qualification range, including:
a concentrated chemical inlet for receiving concentrated chemical;

a diluent inlet for receiving diluent;

a blending tank fluidly coupled to the concentrated chemical inlet and the diluent inlet, for receiving and blending the concentrated chemical and diluent to produce the blended chemical;

a concentrate flow regulating mechanism responsive to concentrate control signals, for controlling the flow of concentrated chemical from the concentrated chemical inlet into the blending tank;

a first concentration measuring instrument having first operating characteristics, for measuring concentration of the blended chemical in the blending tank and providing first instrument readings as a function of the measurements;

a second concentration measuring instrument having second operating characteristics different than the first operating characteristics, for measuring concentration of the blended chemical in the blending tank and providing second instrument readings as a function of the measurements;

memory for storing data representative of:
  concentrate injection information representative of the relationship between the concentrate control signals and blended chemical concentration changes induced by actuation of the concentrate flow regulating mechanism;
  a fine blend setpoint concentration which is less than the qualification range; and
  qualification range setpoint concentrations representative of chemical concentrations within a qualification range of the desired chemical concentration; and a digital processor coupled to the memory, first and second concentration measuring instruments and the concentrate flow regulating mechanism, and including means for:
  (a) monitoring first instrument readings of blended chemical concentration measurements provided by the first concentration measuring instrument;
  (b) generating concentrate control signals as a function of the concentrate injection information and the first instrument readings, to actuate the concentrate flow regulating mechanism and add a finite quantity of the chemical concentrate in an attempt to increase the blended chemical concentration to the desired concentration if the monitored first instrument reading is less than or equal to the fine blend setpoint concentration;
  (c) monitoring second instrument readings of blended chemical concentration measurements provided by the second concentration measuring instrument if the monitored first instrument reading is greater than the fine blend setpoint concentration;
  (d) generating concentrate control signals as a function of the concentrate injection information and the second instrument readings, to actuate the concentrate flow regulating mechanism and add a finite quantity of the chemical concentrate in an attempt to increase the blended chemical concentration to the desired concentration if the monitored second instrument reading is greater than the fine blend setpoint concentration and less than the qualification range setpoint concentrations;
  (e) repeating functions (a)–(d) until the second instrument reading is within the qualification range setpoint concentrations.

29. The chemical blending system of claim 28 wherein:
the memory further includes data representative of a coarse blend setpoint concentration which is less than the fine blend setpoint concentration; and the digital processor further includes means for:
  (f) generating concentrate control signals to actuate the concentrate flow regulating mechanism and continuously add chemical concentrate to increase the blended chemical concentration if the monitored first instrument reading is less than the coarse blend setpoint concentration; and
  (g) repeating functions (a)–(d) and (f), but not (e), until the second instrument reading is within the qualification range setpoint concentrations.

30. The chemical blending system of claim 29 wherein:
the system further includes a recirculation line having an inlet and an outlet in the blending tank;

the system further includes pump means having a suction end and a pressure end in the recirculation line, for recirculating blended chemical from the blending tank through the recirculation line to blend the chemical constituents; and the concentrate flow regulating mechanism couples the concentrated chemical inlet to the recirculation line between the recirculation line inlet and the suction end of the pump means.

31. The chemical blending system of claim 29 wherein the digital processor further includes concentrate injection information update means for updating the concentrate injection information as a function of the difference between expected changes in blended chemical concentration caused by functions (b) and (d), and actual changes in blended chemical concentration caused by functions (b) and (d).

32. The chemical blending system of claim 29 wherein:
the system further includes a diluent flow regulating mechanism responsive diluent control signals, for controlling the flow of diluent into the blending tank;

the memory further includes data representative of diluent injection information representative of the relationship between the diluent control signals and blended chemical concentration changes induced by actuation of the diluent flow regulating mechanism; and the digital processor further includes means for:
  (h) generating diluent control signals as a function of the diluent injection information and at least one of the first and second instrument readings, to actuate the diluent flow regulating mechanism and add a finite quantity of the diluent in an attempt to decrease the blended chemical concentration to the desired concentration if the monitored instrument reading is greater than the qualification range setpoint concentrations; and
  (i) repeating functions (a)–(d), (f) and (h), but not (e) or (g), until the second instrument reading is within the qualification range setpoint concentrations.

33. The chemical blending system of claim 32 wherein the digital processor further includes:
concentrate injection information update means for updating the concentrate injection information as a function of the difference between expected changes in blended chemical concentration caused by functions (b) and (d), and actual changes in blended chemical concentration caused by functions (b) and (d); and diluent injection information update means for updating the concentrate injection information as a function of the difference between expected changes in blended chemical concentration caused by function (h), and actual changes in blended chemical concentration caused by function (h).

34. The chemical blending system of claim 33 wherein:

the system further includes a recirculation line having an inlet and an outlet in the blending tank;

the system further includes pump means having a suction end and a pressure end in the recirculation line, for recirculating blended chemical from the blending tank through the recirculation line to blend the chemical constituents; and the concentrate flow regulating mechanism couples the concentrated chemical inlet to the recirculation line between the recirculation line inlet and the suction end of the pump means.

35. The chemical blending system of claim 28 wherein the first concentration measuring instrument includes measurement means for providing a relatively fast measurement response time with respect to the response time operating characteristics of the second concentration measuring instrument.

36. The chemical blending system of claim 35 wherein the first concentration measuring instrument includes measurement means for providing a substantially instantaneous measurement response time.

37. The chemical blending system of claim 28 wherein the first concentration measuring instrument includes a conductivity-type measuring instrument.

38. The chemical blending system of claim 28 wherein the second concentration measuring instrument includes measurement means for providing a relatively high degree of measurement accuracy with respect to the degree of measurement accuracy operating characteristics of the first concentration measuring instrument.

39. The chemical blending system of claim 28 wherein the second concentration measuring instrument includes a titration analyzer measuring instrument.

40. The chemical blending system of claim 28 wherein:

the concentrate flow regulating mechanism includes a concentrate flow regulating valve;

the memory for storing concentrate injection includes a concentrate injection constant representative of chemical concentration changes as a function of the length of time that the valve is actuated; and the digital processor means for performing function (b) includes means for:

($b_1$) determining the difference in concentration between the concentration reading provided by the first concentration measuring instrument and the desired concentration;

($b_2$) accessing the memory and determining a concentrate flow regulating valve actuation time as a function of the concentration difference determined by function $b_1$ and the concentration injection constant; and ($b_3$) actuating the concentrate flow regulating valve for the actuation time determined by function $b_2$.

* * * * *